(12) United States Patent
Apreleva et al.

(10) Patent No.: US 9,613,309 B1
(45) Date of Patent: Apr. 4, 2017

(54) SYSTEM AND METHOD FOR PREDICTING SIGNIFICANT EVENTS USING A PROGRESS CURVE MODEL

(71) Applicant: HRL Laboratories, LLC, Malibu, CA (US)

(72) Inventors: Sofia Apreleva, Santa Monica, CA (US); Tsai-Ching Lu, Wynnewood, PA (US)

(73) Assignee: HRL Laboratories, LLC, Malibu, CA (US)

( * ) Notice: Subject to any disclaimer, the term of this patent is extended or adjusted under 35 U.S.C. 154(b) by 466 days.

(21) Appl. No.: 14/207,357

(22) Filed: Mar. 12, 2014

Related U.S. Application Data

(60) Provisional application No. 61/780,926, filed on Mar. 13, 2013.

(51) Int. Cl.
*G06N 3/04* (2006.01)

(52) U.S. Cl.
CPC .................................. *G06N 3/049* (2013.01)

(58) Field of Classification Search
CPC ................................ G06N 3/02; G06N 3/049
USPC ........................................................ 706/21
See application file for complete search history.

(56) References Cited

PUBLICATIONS

Apreleva S. et al., "Progress Curves and the Prediction of Significant Market Events", Second International Conference, COMPLEX 2012, Santa Fe, NM, USA, Dec. 5-7, 2012.*

Johnson N. et al., "Dynamic Red Queen explains patterns in fatal insurgent attacks", 2011.*

Bollen, J., Mao, H., & Zeng, X. (2011). Twitter mood predicts the stock market. Journal of Computational Science, 2(1), 1-8.

Carpinteiro, O. A. S., Leite, J. P. R. R., Pinheiro, C. A. M., & Lima, I. (2012). Forecasting models for prediction in time series, Artificial Intelligence Review, 38(2), 163-171.

Fama, E. F. (1996). Market efficiency, long-term returns, and behavioral finance. Journal of Financial Economics, 49(3), 283-306.

Fox, E., Sudderth, E. B., Jordan, M. I., & Willsky, A. S. (2011). Bayesian nonparametric inference of switching dynamic linear models. IEEE Transactions on Signal Processing, 59(4), 1569-1585.

Huang. W., Nakamori. Y., & Wang, S. -. (2005). Forecasting stock market movement direction with support vector machine. Computers and Operations Research, 32(10), 2513-2522.

Johnson, N., et al. (2011). Pattern in escalations in insurgent and terrorist activity. Science. 333(6038), 81-84.

Lu, B., Song, X. -., & Li, X. -. (2012). Bayesien analysis of multi-group nonlinear structural equation models with application to behavioral finance, Quantitative Finance, 12(3), 477-488.

(Continued)

*Primary Examiner* — Dave Misir

(74) *Attorney, Agent, or Firm* — Tope-McKay & Associates

(57) ABSTRACT

Described is system for predicting significant events using a progress curve model. The system first determines Z-score values for a predetermined period of a time series to generate a Z-score time series. The Z-score time series are partitioned into a plurality of E-periods to define time frames for progress curve model (PCM) fitting. An E-period is defined as a period of escalation and de-escalation. Finally, a future event is predicted based on an absolute Z-score value that is greater than or equal to a predetermined number.

18 Claims, 13 Drawing Sheets

(56) References Cited

PUBLICATIONS

Preis, T., Schneider, J. J., & Stanley, H. E. (2011). Switching processes in financial markets. Proceedings of the National Academy of Sciences of the United States of America, 108(19), 7674-7678.

Wang, J., Wang, J., Zhang, Z., & Guo, S. -. (2012). Stock index forecasting based on a hybrid model. Omega, 40(6), 758-766.

Shiller, R. J. (2003). From efficient markets theory to behavioral finance. Journal of Economic Perspectives. 17(1), 83-104.

Watanabe, K., Takayasu, H., & Takayasu, M. (2007). A mathematical definition of the financial bubbles and crashes. Physica A: Statistical Mechanics and its Applications. 383(1 SPEC, ISS.). 120-124.

Zantedeschi, D., Damien, P., & Polson, N. G. (2011). Predictive macro-finance with dynamic partition models. Journal of the American Statistical Association, 106(494), 427-439.

Filimonov V., & Sornette D., (2011). Self-excited multifractal dynamics. EPL (Europhysics Letters). 94(4), 46003.

Polson, N.G., & Scott J.C. (2011). An empirical test for Eurozone contagion using an asset-pricing model with heavy-tailed stochastic volatility, ArXiv:1110.5789.

A. Clauset, K.S. Gleditsch (2012). The developmental dynamics of terrorist organizations. PLOS One, vol. 7, Issue 11, e48633.

J. M. Dutton, A. Thomas, "Treating Progress Functions as a Managerial Opportunity," Acad. Manage. Rev. Apr. 1, 1984 vol. 9, No. 2, 235-247.

L. Argote, D. Epple, Learning curves in manufacturing. Science 247, 920 (1990).

S. P. Saraswat, J. T. Gorgone, Organizational learning curve in software installation: An empirical investigation. Inf. Manage. 19, 53 (1990).

A. Mottrie et al, Impact of the learning curve on perioperative outcomes in patients who underwent robotic partial nephrectomy for parenchymal renal tumours. Eur. Urol. 58, 127 (2010).

\* cited by examiner

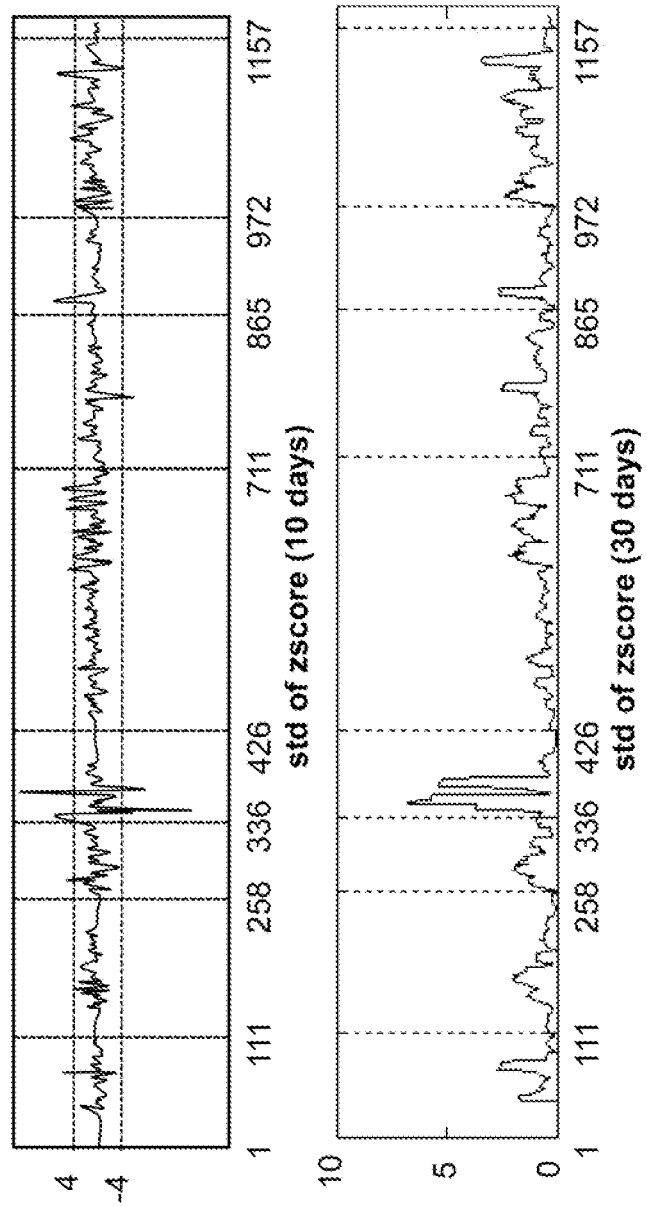

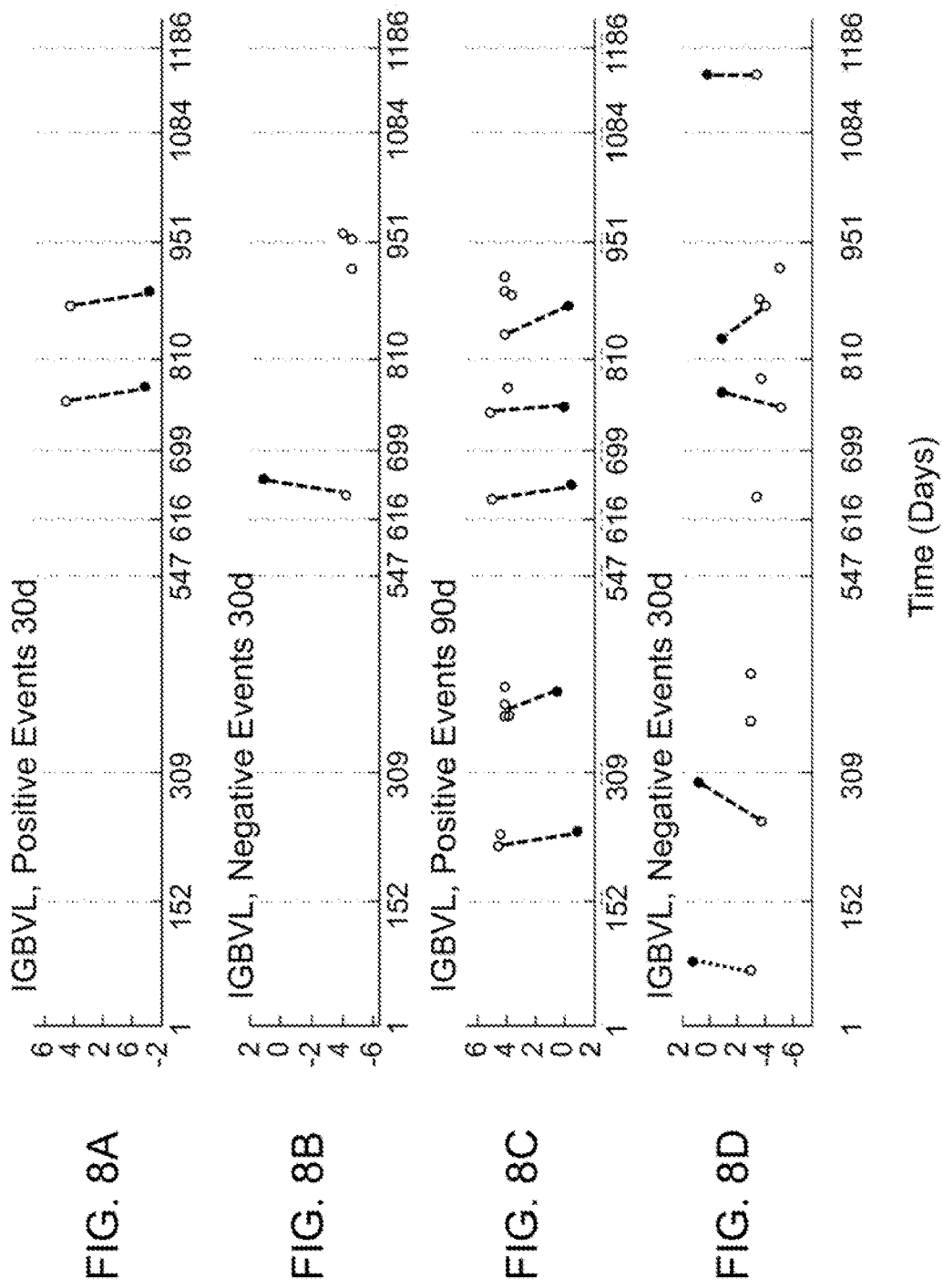

Pos. 30D

| Method | Intercepts $\nu_n$ | Slopes $\nu_n$ | Intercepts $\tau_n$ | Slopes $\tau_n$ | R $\nu_n$ | R $\tau_n$ |
|---|---|---|---|---|---|---|
| I | 0.19481 | 0.03011 | 0.00082 | 0.00193 | 0.00725 | 0.00834 |
| II | 0.97556 | 0.38436 | 0.71327 | 0.69671 | 0.49038 | 0.21443 |
| III | 0.00173 | 0.00011 | 0.04379 | 0.04379 | 0.00008 | 0.01428 |

FIG. 9A

Neg. 30D

| Method | Intercepts $\nu_n$ | Slopes $\nu_n$ | Intercepts $\tau_n$ | Slopes $\tau_n$ | R $\nu_n$ | R $\tau_n$ |
|---|---|---|---|---|---|---|
| I | 0.02745 | 0.08955 | 0.14402 | 0.72344 | 0.02222 | 0.87667 |
| II | 0.60838 | 0.22055 | 0.8285 | 0.13333 | 0.42567 | 0.01061 |
| III | 0.00385 | 0.01535 | 0.24464 | 0.21098 | 0.00482 | 0.65643 |

FIG. 9B

Pos. 90D

| Method | Intercepts $\nu_n$ | Slopes $\nu_n$ | Intercepts $\tau_n$ | Slopes $\tau_n$ | R $\nu_n$ | R $\tau_n$ |
|---|---|---|---|---|---|---|
| I | 0.00001 | 0.00029 | 0.22755 | 0.05098 | 0.00002 | 0.67475 |
| II | 0.49325 | 0.57649 | 0.39936 | 0.12133 | 0.40901 | 0.04833 |
| III | 0.00007 | 0.00001 | 0.11758 | 0.04093 | 0.00001 | 0.14779 |

FIG. 9C

Neg. 90D

| Method | Intercepts $\nu_n$ | Slopes $\nu_n$ | Intercepts $\tau_n$ | Slopes $\tau_n$ | R $\nu_n$ | R $\tau_n$ |
|---|---|---|---|---|---|---|
| I | 0.00713 | 0.01248 | 0.00965 | 0.10357 | 0.01189 | 0.13235 |
| II | 0.45183 | 0.67793 | 0.13995 | 0.72016 | 0.89812 | 0.79491 |
| III | 0.11394 | 0.02779 | 0.14126 | 0.10413 | 0.14228 | 0.02081 |

FIG. 9D

SYSTEM AND METHOD FOR PREDICTING SIGNIFICANT EVENTS USING A PROGRESS CURVE MODEL

CROSS-REFERENCE TO RELATED APPLICATIONS

This is a Non-Provisional patent application of U.S. Provisional Application No. 61/780,926, filed in the United States on Mar. 13, 2013, entitled, "System and Method for Predicting Significant Events Using Progress Curve Model."

GOVERNMENT LICENSE RIGHTS

This invention was made with government support under U.S. Government Contract Number D12PC00285, IARPA: Open Source Indicator. The government has certain rights in the invention.

BACKGROUND OF THE INVENTION (1) Field of Invention

The present invention relates to a system for predicting significant events and, more particularly, to a system for predicting significant events using a progress curve model.

(2) Description of Related Art

Current forecasting methods for analysis of significant events can be primarily divided into four categories: 1) statistical modeling of time series; 2) machine learning methods; 3) analysis of influence of social behavior on economic markets (behavioral finance); and 4) empirical findings of patterns in time series behavior. The most popular data for financial prediction are time series of returns, stock indexes (i.e., closing/opening prices), volume of transactions, and interest rates.

Wang, Wang, Zhang and Guo (see the List of Incorporated Cited Literature References, Literature Reference No. 9) employed three methods for forecasting stock market price index: the exponential smoothing model (ESM), autoregressive integrated moving average model (ARIMA), and the back propagation neural network (BPNN). In their paper, a hybrid approach combining ESM, ARIMA, and BPNN is proposed to be the most advantageous of all three models. The weight of the proposed hybrid model (PHM) was determined by genetic algorithm (GA). The closing of the Shenzhen Integrated Index (SZII) and opening of the Dow Jones Industrial Average Index (DJIAI) were used as illustrative examples to evaluate the performances of the PHM. Numerical results showed that the proposed model outperforms all traditional models, including ESM, ARIMA, BPNN, the equal weight hybrid model (EWH), and the random walk model (RWM).

Additionally, Carpinteiro, Leite, Pinheiro, and Lima (see Literature Reference No. 2) compared three machine learning techniques for forecasting: multilayer perceptron, support vector machine, and hierarchical model. The hierarchical model is made up of a self-organizing map and a support vector machine, the latter on top of the former. The models are trained and assessed on a time series of a Brazilian stock market fund. The results from the experiments show that the performance of the hierarchical model is better than that of the support vector machine, and much better than that of the multilayer perceptron.

Further, Bollen, Mao and Zeng (see Literature Reference No. 1) demonstrated an approach of studying the influence of society mood states on economic markets, as opposed to behavioral finance, which focuses on the collective psychology of individuals involved in sale processes. In particular, they investigated whether measurements of collective mood states derived from large-scale Twitter feeds are correlated to the value of the Dow Jones Industrial Average (DJIA) over time. The text content of daily Twitter feeds was analyzed by two mood tracking tools, namely OpinionFinder which measures positive versus negative mood, and Google-Profile of Mood States (GPOMS) which measures mood in terms of six dimensions (Calm, Alert, Sure, Vital, Kind, and Happy). A Granger causality analysis and a Self-Organizing Fuzzy Neural Network were used to investigate the hypothesis that public mood states, as measured by the OpinionFinder and GPOMS mood time series, are predictive of changes in DJIA closing values. Obtained results indicated that the accuracy of DJIA predictions can be significantly improved by the inclusion of some public mood dimensions, but not others.

Moreover, Zantedeschi, Damien, and Poison (see Literature Reference No. 12) employed dynamic partition models to predict movements in the term structure of interest rates. This allowed the authors to investigate large historic cycles in the performance of how interest rates behave and to offer policy makers guidance regarding future expectations on their evolution. The authors used particle learning to learn about the unobserved state variables in a new class of dynamic product partition models that relate macro-variables to term structures. The empirical results, using data from 1970 to 2000, clearly identified some of the key shocks to the economy, such as recessions. Time series of Bayes factors served as a leading indicator of economic activity, validated via a Granger causality test.

In addition, Poison and Scott (see Literature Reference No. 11) proposed a model of a financial contagion that accounts for explosive, mutually exciting shocks to market volatility. The authors fit the model using country-level data during the European sovereign debt crisis, which has its roots in the period from 2008 to 2010, and continued to affect global markets up to October, 2011. Analysis presented in Literature Reference No. 11 showed that existing volatility models are unable to explain two key stylized features of global markets during presumptive contagion periods. The first feature was that shocks to aggregate market volatility can be sudden and explosive. The second feature was that shocks to aggregate market volatility are associated with specific directional biases in the cross-section of country-level returns. Their proposed model rectified this deficit by assuming that the random shocks to volatility are heavy-tailed and correlated cross-sectionally both with each other and with returns.

Furthermore, Preisa, Schneiderd, and Stanley (see Literature Reference No. 8) presented a novel approach resulting from studying patterns in transaction volumes, where fluctuations are characterized by abrupt switching creating upward and downward trends. They found scale-free behavior of the transaction volume after each switching. The universality of the results was tested by performing a parallel analysis of fluctuations in time intervals between transactions. The authors believed that their findings can be interpreted as being consistent with time-dependent collective behavior of financial market participants. Taking into account that fluctuations in financial markets can vary from hundreds of days to a few minutes, the authors raised the question of whether these ubiquitous switching processes have quantifiable features independent of the time horizon studied. Moreover, they suggested that the well-known catastrophic bubbles that occur on large time scales, such as the most recent financial crisis, may not be outliers but single dramatic representatives caused by the formation of increasing and decreasing trends on time scales varying over nine orders of magnitude from very large down to very small.

Finally, the prior art discloses a self-excited nultifractal statistical model describing changes of a particular time series rather than the time series themselves (see Literature Reference No. 13). Here, the authors proposed a model defined such that the amplitudes of the increments of the process were expressed as exponentials of a long memory of past increments. The principal feature of the model existed in the self-excitation mechanism combined with exponential nonlinearity (i.e., the explicit dependence of future values of the process on past ones). Distributions of daily changes of stock markets share the same features as distributions of the values of Z-scores: turbulent flows, seismicity of financial markets, multifractality, and heavy tailed probability density functions.

Each of the prior methods described above exhibit limitations that make them incomplete. Thus, a continuing need exists for an accurate prediction method for the prediction of significant events based on a progress curve model and its escalation parameters.

SUMMARY OF THE INVENTION

The present invention relates to a predicting significant events and, more particularly, to a system for predicting significant events using a progress curve model. The system comprises one or more processors and a memory having instructions such that when the instructions are executed, the one or more processors perform multiple operations. The system determines Z-score values for a predetermined period of a time series, and a Z-score time series is generated from the Z-score values. The Z-score time series is partitioned into a plurality of E-periods to define a plurality of time frames for progress curve model (PCM) fitting, wherein an E-period is defined as a period of escalation and de-escalation. At least one future event is then predicted based on an absolute Z-score value that is greater than or equal to a predetermined number.

In another aspect, a set of regression parameters for PCMs is derived for prediction of the at least one future event in a current E-period, wherein the set of escalation parameters are derived from historical data or directly from the current E-period.

In another aspect, Z-score values with a sigma value greater than or equal to one are identified, and a set of series $\tau_n$ and $v_n$ are generated for the identified Z-score values, wherein $\tau_n$ is a inter-event time series and $v_n$ is an inter-event intensity series. Regression coefficients $b^\tau_n$ and $b^v_n$ are determined from the set of series $\tau_n$ and $v_n$. A set of regression parameters $\Theta_n = (b_n^\tau, b_n^v)$ are determined for each E-period n from the regression coefficients $b^\tau_n$ and $b^v_n$. A set of parameters $\eta = \{p^\tau; p^v\}$ characterizing a pooled set of regression coefficients are obtained.

In another aspect, the set of regression parameters $\Theta_n$ serve as an input to a first path for predicting at least one future event, and the set of parameters $\eta$ serve as an input to a second path for predicting at least one future event.

In another aspect, the set of regression parameters $\Theta_n$ is used in an extrapolation method for predicting at least one future event according to the following:

$$n = \exp\left(\frac{(I - Z_0)(-b_v + 1)}{v_1}\right) / (-b_v + 1),$$

where I is a value of a significant Z-score; $Z_0$ is a Z-score value at the time moment of a first sigma event; $b_v$ is a slope of a PCM fit for an inter-event intensity series, and $v_1$ is an intercept of the PCM fit.

In another aspect, the set of parameters $\eta$ is used in a method using trained linear dependence on the slope on intercepts.

In another aspect, the present invention also comprises a method for causing a processor to perform the operations described herein.

In yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 3A illustrates the Bolsa de Valores de Panama General Index (BVPSBVPS) Z-scores from a 30-day time window according to the principles of the present invention;

FIG. 3B illustrates the standard deviations of the Z-scores of FIG. 3A with a 10-day time window according to the principles of the present invention;

FIG. 8A illustrates prediction results using an extrapolation method for positive events in a 30-day time period according to the principles of the present invention;

FIG. 8B illustrates prediction results using an extrapolation method for negative events in a 30-day time period according to the principles of the present invention;

FIG. 8C illustrates prediction results using an extrapolation method for positive events for a 90-day time period according to the principles of the present invention;

FIG. 8D illustrates prediction results using an extrapolation method for negative events for a 90-day time period according to the principles of the present invention;

FIG. 9A is a table of p-values for distributions of correlation coefficients for positive events for a 30-day time period according to the principles of the present invention;

FIG. 9B is a table of p-values for distributions of correlation coefficients for negative events for a 30-day time period according to the principles of the present invention;

FIG. 9C is a table of p-values for distributions of correlation coefficients for positive events for a 90-day time period according to the principles of the present invention;

FIG. 9D is a table of p-values for distributions of correlation coefficients for negative events for a 90-day time period according to the principles of the present invention;

DETAILED DESCRIPTION

Figure 1:
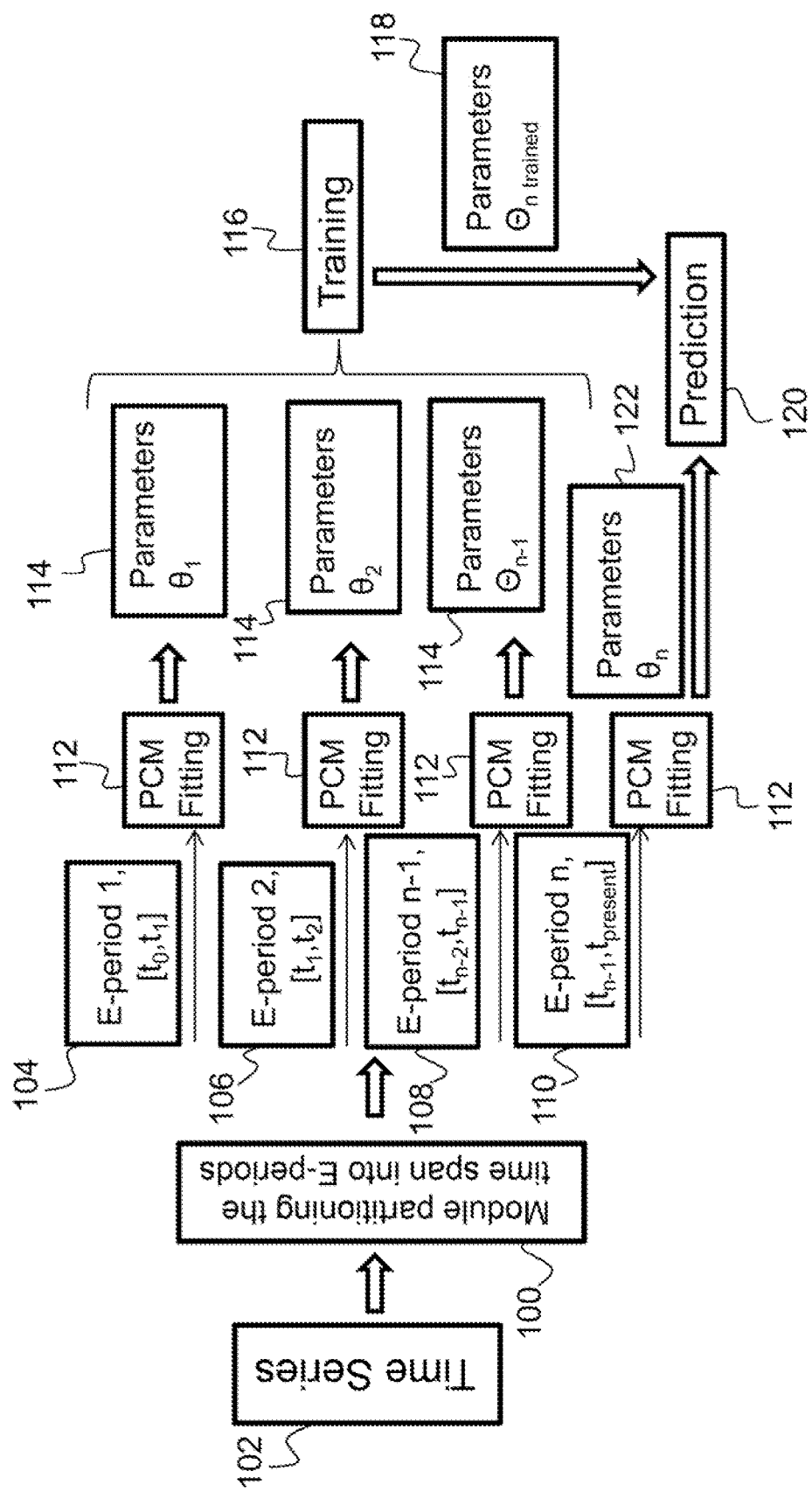
FIG. 1 illustrates a systematic view of a progress curve prediction system according to the principles of present invention.

The present invention relates to a predicting significant events and, more particularly, to a system for predicting significant events using a progress curve model. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) LIST OF INCORPORATED CITED LITERATURE REFERENCES

The following references are cited throughout this application. For clarity and convenience, the references are listed herein as a central resource for the reader.

The following references are hereby incorporated by reference as though fully included herein. The references are cited in the application by referring to the corresponding literature reference number, as follows:

1. Bollen, J., Mao, H., & Zeng, X. (2011). Twitter mood predicts the stock market. Journal of Computational Science, 2(1), 1-8.
2. Carpinteiro, O. A. S., Leite, J. P. R. R., Pinheiro, C. A. M., & Lima, I. (2012). Forecasting models for prediction in time series. Artificial Intelligence Review, 38(2), 163-171.
3. Fama, E. F. (1998). Market efficiency, long-term returns, and behavioral finance. Journal of Financial Economics, 49(3), 283-306.
4. Fox, E., Sudderth, E. B., Jordan, M. I., & Willsky, A. S. (2011). Bayesian nonparametric inference of switching dynamic linear models. IEEE Transactions on Signal Processing, 59(4), 1569-1585.
5. Huang, W., Nakamori, Y., & Wang, S. —. (2005). Forecasting stock market movement direction with support vector machine. Computers and Operations Research, 32(10), 2513-2522.
6. Johnson, N., et al. (2011). Pattern in escalations in insurgent and terrorist activity. Science, 333(6038), 81-84.
7. Lu, B., Song, X. —., & Li, X. —. (2012). Bayesian analysis of multi-group nonlinear structural equation models with application to behavioral finance. Quantitative Finance, 12(3), 477-488.
8. Preis, T., Schneider, J. J., & Stanley, H. E. (2011). Switching processes in financial markets. Proceedings of the National Academy of Sciences of the United States of America, 108(19), 7674-7678.
9. Wang, J., Wang, J., Zhang, Z., & Guo, S. —. (2012). Stock index forecasting based on a hybrid model. Omega, 40(6), 758-766.
10. Shiller, R. J. (2003). From efficient markets theory to behavioral finance. Journal of Economic Perspectives, 17(1), 83-104.
11. Watanabe, K., Takayasu, H., & Takayasu, M. (2007). A mathematical definition of the financial bubbles and crashes. Physica A: Statistical Mechanics and its Applications, 383(1 SPEC. ISS.), 120-124.
12. Zantedeschi, D., Damien, P., & Poison, N. G. (2011). Predictive macro-finance with dynamic partition models. Journal of the American Statistical Association, 106(494), 427-439.
13. Filimonov V., & Sornette D. (2011). Self-excited multifractal dynamics. EPL (Europhysics Lletters). 94(4), 46003.
14. Poison, N. G., & Scott J. C. (2011). An empirical test for Eurozone contagion using an asset-pricing model with heavy-tailed stochastic volatility, ArXiv:1110.5789.

15. A. Clauset, K. S. Gleditsch (2012). The developmental dynamics of terrorist organizations. PLOS One, Volume 7, Issue 11, e48633.
16. J. M. Dutton, A. Thomas, Acad. Manage. Rev. 9, 235 (1984).
17. L. Argote, D. Epple, Learning curves in manufacturing. Science 247, 920 (1990).
18. S. P. Saraswat, J. T. Gorgone, Organizational learning curve in software installation: An empirical investigation. Inf. Manage. 19, 53 (1990).
19. A. Mottrie et al, Impact of the learning curve on perioperative outcomes in patients who underwent robotic partial nephrectomy for parenchymal renal tumours. Eur. Urol. 58, 127 (2010).

(2) PRINCIPAL ASPECTS

The present invention has three "principal" aspects. The first is a system for predicting significant events. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for predicting significant events. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) INTRODUCTION

Progress curves have been used to model the evolution of a wide range of human activities, from manufacturing to cancer surgery. See Literature Reference Nos. 16-20 for a description of progress curves. In each case, the time to complete a given challenging task is found to decrease with successive repetitions and follows an approximate power law. Recently, progress curve models have been employed in connection with the prediction of the escalation of fatal attacks by insurgent groups, with the insurgency "progressing" by continually adapting, while the opposing force tries to counter-adapt (see Literature Reference No. 6). Described herein is an example application of progress curves to financial market events in order to gain insight into the underlying dynamics of significant changes in economic markets, such as stock indices and the currency exchange rate. Although the system according to the principles of the present invention was tested and verified using financial market data, the system may be used for prediction of events in a variety of areas including, but not limited to, civil unrests with social media signals, cyber security with traffic signals, and vehicle health management with operational signals.

Classical econometric approaches for financial market study and prediction rely on statistical models of time series to reveal trends (i.e., the connections between consecutive time points). This relation serves as a basis for the prediction of time series value at the next time period. Auto-regression models, Hidden Markov Models, Random Walk theory, Efficient Market Hypothesis (EMH) and other models all have applications in the world of finance (see Literature Reference Nos. 9 and 10). Machine learning models, on the other hand, have gained their popularity by incorporating patterns and features characterized in historical data (see Literature Reference No. 2).

Behavior finance has developed into a mature science, capturing the dependence of financial time series on the collective behavior of individuals involved in the marketing (see Literature Reference No. 10). Recently, the vision of the influence of society on economic indicators has changed to incorporate the broad range of social, political, and demographic processes (see Literature Reference Nos. 1 and 8). Most of the aforementioned works have empirical characteristics in order to overcome limitations of existing classical approaches.

(4) SPECIFIC DETAILS

Described is a system which addresses the need of predicting significant changes in system behaviors, such as bubbles and downfalls in economic markets, birth and development of civil unrests and protests, and other major social events. To gain a fundamental understanding of behavior changes, the pattern of building up resulting from the interactions between escalation and switching processes is analyzed. The aforementioned switching process is defined in Literature Reference No. 8. It essentially characterizes the switching of a volume of a stock price from upward (downward) to downward (upward). The aforementioned escalation process refers to the increase in the rate of a dynamic process of human behaviors. Examples are provided in Literature Reference No. 6. The system according to the principles of the present invention predicts significant events with agnostic prediction horizons (i.e., not specifying prediction horizons in a priori) derived directly from observed system states.

The present invention is a system for prediction of significant changes in system behaviors from an observed time series of system states, a non-limiting example of which includes economic markets of stock indices and currency exchange rates. The approach described herein consists of the integration of switching and escalation processes and the application of a progress curve model (PCM) to time series of system behaviors in order to gain insight into the dynamics underlying significant changes in a system, such as an economical system or a political system.

According to the principles of the present invention, time series are modeled as a sequence of distinct periods in order to describe the successive buildup toward significant events. Examples of significant events include, but are not limited to, bubbles and downfalls in economic markets, and birth and development of civil unrests and protests. Each of these periods, hereinafter referred to as E-periods, is a combination of escalation processes and switching processes. The present invention focuses on Z-score values calculated over predetermined periods of the time series (e.g., 30- and 90-day periods) to capture and quantify the stability of the time series. A Z-score is the (signed) number of standard deviations an observation is above the mean. As a non-limiting example, the definition of a Z-score for 30 days as applied to the present invention is the following: z-score (30)=(X-MA)/SD, where X is the 1-day difference, and MA is the trailing 30-day moving average of I-day differences, and SD is the standard deviation of those trailing 30-day moving I-day differences. For the purposes of this application, the terms Z-score values and sigma values may be used interchangeably.

The time series of Z-score values can be partitioned into periods where a stable region is followed by an escalation process prior to calming down (i.e., de-escalation) in a final stage. With progress curve modeling of escalation processes within the partitioned periods, the method described herein can predict significant events, which are defined by an absolute Z-score value≥4 for daily time differences within a 30-day period, and an absolute Z-score value≥3 within a 90-day period.

As described above, the system comprises a time series partitioning method that derives E-periods with distinctive escalation processes within. Additionally, an escalation parameter fitting method trains on historical data within an E-period to derive escalation parameters for progress curve models. Further, a progress curve prediction method predicts significant events (e.g., absolute Z-score value≥4 daily time differences within a 30-day period, and Z-score value≥3 within a 90-day period) based on parameters obtained at the training stage. Each of these aspects will be described in further detail below.

FIG. 1 illustrates a systematic view of a progress curve prediction system according to the principles of the present invention. Using a partitioning module 100, Z-score time series 102 are partitioned into periods of escalation/de-escalation (e.g., E-period 1, 104; E-period 2, 106; E-period n-1, 108; E-period n, 110) in order to define time frames for progress curve model (PCM) fitting 112. Within each period, sequences of inter-event time intervals and intensities are constructed and regression parameters 114 ($\theta_1$, $\theta_2$, $\theta_{n-1}$) are found. Intensities refer to the differences in either volumes or prices between two consecutive trading days. A linear regression fit is performed to derive regression parameters (i.e., slope and intercepts).

An escalation parameter fitting method trains 116 on historical data within an E-period (e.g., E-period 1, 104) to derive escalation parameters ($\theta_n$ trained 118) for progress curve models for prediction 120 of future significant events for a current period. Prediction 120 can be performed based on regression coefficients/escalation parameters ($\theta_n$ trained 118) obtained from historical data, or directly from the current E-period (e.g., $\theta_n$ 122) if the number of inter-event sequences is ≥4.

The present invention combines escalation processes with switching processes in order to describe the successive buildup toward significant market events. In one aspect, Z-score values were first calculated over 30-day and 90-day periods for the main stock indices and exchange rates and were used to capture the stability of escalation and de-escalation periods. Next, switching processes, which govern the transitions between such non-stationary periods and regular stationary periods separated by the partitioning module (depicted as element 100 in FIG. 1), of the financial market were considered. This enabled the partitioning of the time series of Z-score values into periods where a stable region is followed by an escalation, before calming down in a final stage. With progress curve modeling of escalation processes within the E-periods, significant events can be predicted (depicted as element 120 in FIG. 1) with absolute Z-score values≥4 for daily time differences within a 30-day period, and absolute Z-score values≥3 within a 90-day period.

To define distinct periods of Z-score time series, the standard deviation (STD) of the Z-score is used as the measure of market stability. A roughly periodical structure emerges when the STD of the Z-score is calculated over different time intervals. The longer the interval, the more evident is the separation into periods of low and high rates of changes in Z-score values. Two time series $\tau_n$ and $v_n$ of points with increasing absolute Z-score values≥1 for inter-event time and inter-event intensity were built, and then progress curve models were fit on a log-log scale. For each E-period, only points with an absolute Z-score score≥1 were picked to form inter-event time and inter-event intensity time series. Positive and negative significant events were considered separately by fitting separate escalation parameters. In experimental studies, it was determined that dependencies of the regression coefficient on intercepts for each market indicator (as defined from the fit of the progress curve on inter-event time and intensities time series) obey a simple linear relationship, as will be described in further detail below. Examples of market indicators include stock indices and exchange rates.

Figure 2:
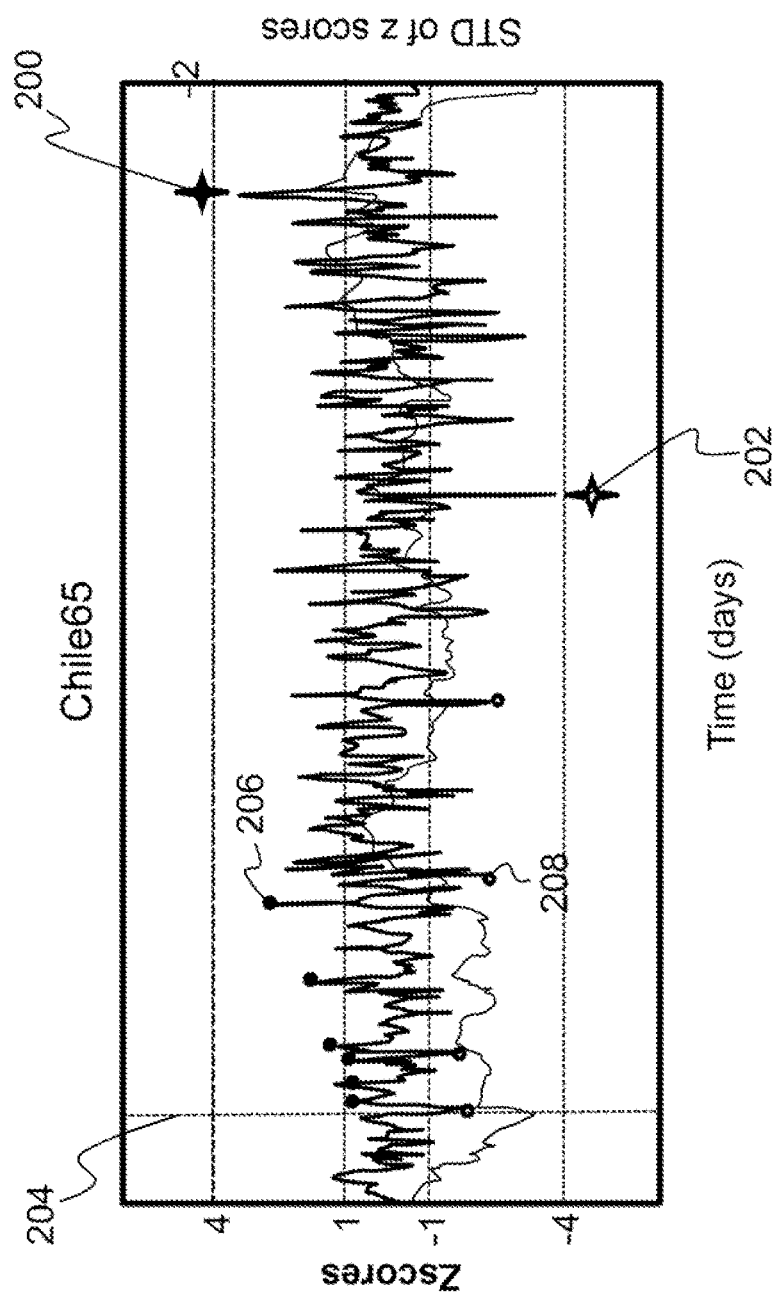
FIG. 2 illustrates an example of predictions made for two significant events for the Chile65 stock index according to the principles of the present invention.

To make a prediction as to when in the future a significant event with a high sigma value (or Z-value) will occur, simple extrapolation using regression parameters obtained from historical data were used. The process described above was tested on 16 market indicators (9 stock indices and 7 exchange rates). FIG. 2 is a plot illustrating an example of the predictions made for two significant events for the Chile65 stock index designated with a closed star 200 (Z-score=4.2) and an open star 202 (Z-score=−4.3). A positive event (closed star 200) with a Z-score=4.2 for the Chile65 stock index can be predicted using a progress curve formula approximately 220 days in advance. A negative event (open star 202) for the same escalation period with a sigma value of −4.3 can be predicted approximately 65 days in advance. A dashed vertical line 204 indicates the beginning of a new E-period. Closed circles 206 represent points forming a time series corresponding to positive events. Open circles 208 represent points forming a time series corresponding to negative events. The points represent Z-score values.

(4.1) Partition of Z-Score Time Series into E-Periods

Figures 3C, 3D:
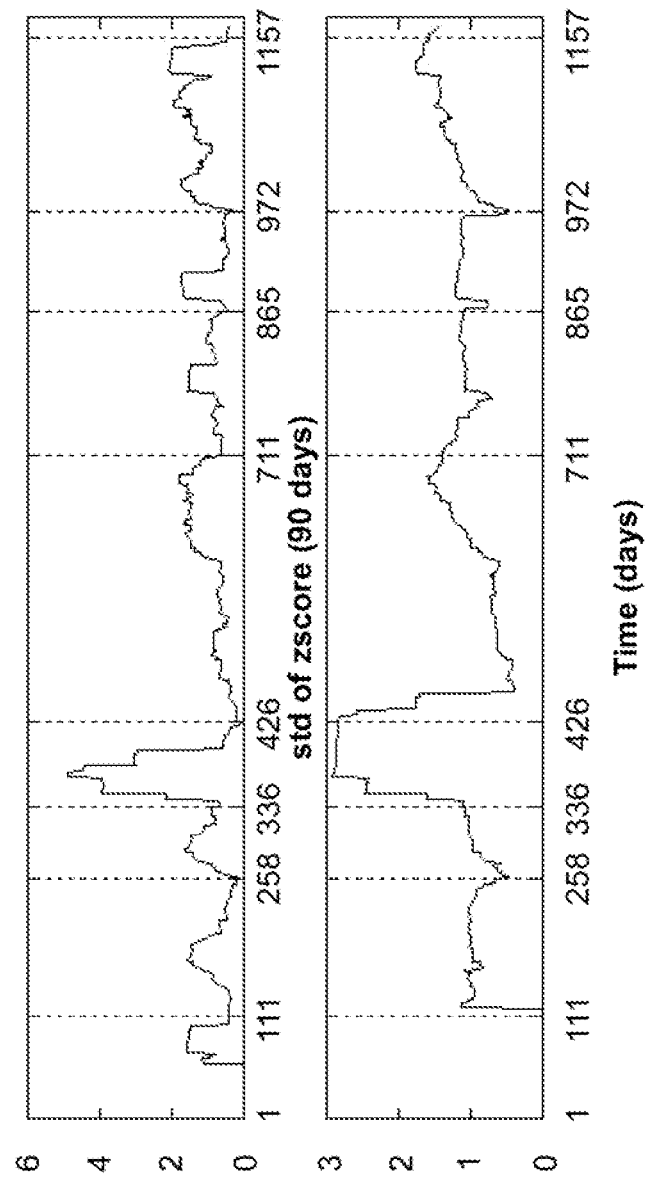
FIG. 3C illustrates the standard deviations of the Z-scores of FIG. 3A with a 30-day time window according to the principles of the present invention.
FIG. 3D illustrates the standard deviations of the Z-scores of FIG. 3A with a 90-day time window according to the principles of the present invention.

In order to characterize significant changes in economic indicators, a raw time series is transformed to a Z-score time series, with time windows of 30 days and 90 days. FIGS. 3A-3D illustrate identification of E-periods. FIG. 3A shows the Bolsa de Valores de Panama General Index (BVPSB-VPS) Z-scores of a 3-day time window. FIGS. 3B, 3C, and 3D illustrate the standard deviations of Z-scores with a 10-day time window, 30-day time window, and 90-day time window, respectively. The dashed vertical lines indicate time series partitioned into different (de)escalation periods based on minima and maxima of the standard deviations of Z-scores.

As shown in FIGS. 3A-3D, the series can be viewed as a sequence of "waves of burstness" with a large amplitude of oscillation. The present invention separates these "waves"

and considers them as separate objects of interest representing an escalation process followed by a period of calming down. It is an open question whether each of the burst periods should be considered separately. Sometimes the sequence of the burst periods with successfully magnifying amplitudes reflects the building up of one large escalation process with unique underlying dynamics. It is assumed that each E-period is manifested by a significant event with an absolute value of Z-score≥4 calculated over 30-day time windows and an absolute value of Z-score≥3 over 90-day time windows. This definition implies the unification of several (e.g., two or three) burst periods into one E-period.

The following steps are performed to define E-periods:
1. Derive Z-score time series from the daily difference of an original time series (e.g., daily closing price of BVPSBVPS) with a chosen moving time window (e.g., 30 or 90 days).
2. Derive the standard deviation time series of Z-score time series (called SD time series) with respect to different time windows (e.g., 10, 30, 90 day windows).
3. Apply standard minimum/maximum identification algorithms to identify local minima and maxima in the identified SD time series from Step 2. A non-limiting example of standard minimum/maximum identification algorithm includes the findpeaks( ) function in the MATLAB™ Signal Processing Toolbox™ produced by the MathWorks, Inc.
4. Output E-periods as the duration of the sequences of local minima and maxima identified in Step 3.

FIGS. 3B-3D show the SD time series for the Z-score time series shown in FIG. 3A. Step 3 from above results in the identification of local minima and maxima (dashed vertical lines) that leads to partitioning and the output of corresponding E-periods.

Intuitively, the daily difference of closing prices represents the first derivative of the original time series. The Z-score time series of this first derivative represents the second derivative: volatility. The SD time series, the standard deviation of the Z-score time series, represents the third derivative: momentum of volatility. The identification of local minima and maxima of the SD time series naturally arises from the identification of switching of momentum of volatility: E-periods. This partition process enables one to identify periods where escalation and de-escalation processes operate within the identified boundary.

(4.2) Progress Curve Modeling

Following Johnson's Progress Curve modeling approach for escalation process (see Literature Reference No. 6), the following formula was used:

$$T_n = T_1 n^{-b} \quad (1)$$

where $T_n$ is a time interval between (n−1)-th and n-th days, n is the number of days, and b is an escalation rate. The challenge in progress curve modeling is that behavior processes may switch from escalation to de-escalation with different scales and intensity. In the previous sections, an approach to identify escalation periods, inter-event times, and intensity was described. In the following section, the steps for escalation parameter fitting modules will be presented.

In a first step of the escalation parameter fitting module, inter-event times and intensities for escalation trends are extracted. For each period, "dark" events are identified separately for positive and negative sequences with absolute values≥1. "Dark" events are events with absolute values≥1 and ≤4 (for 30 day z-score time series) and ≤for 90 day time series. For each 4-sigma (-4-sigma) event, prior "dark" events are identified to build up the escalation (de-escalation) event trends and then derive inter-event time and intensity. 4-sigma (-4-sigma) are events with absolute values of Z-scores≥4 for time series with time windows of 30 days and Z-scores≥3 for time series with time windows of 90 days. These events are also referred to as significant events. A series $\tau_n$ is used for inter-event times, and a series $v_n$ is used for inter-event intensities.

Figure 4:
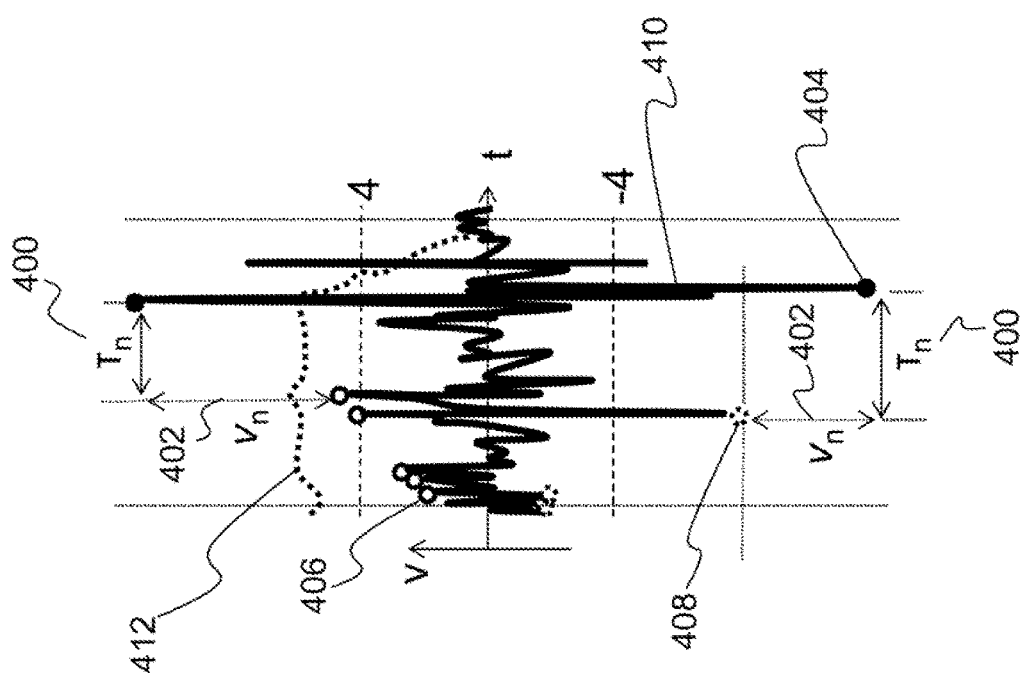
FIG. 4 illustrates the building of inter-event time series according to the principles of the present invention.

FIG. 4 is an illustration depicting building of inter-event time series $\tau_n$ 400 and $v_n$ 402. Filled circles 404 represent significant events, open circles 406 denote "dark" positive events, dashed circles 408 denote "dark" negative events, the solid line 410 plots Z-scores, and the dashed line 412 is used for showing the raw index (Indice General de la Bolsa de Valores de Lima (IGBVL) index).

In a second step of the escalation parameter fitting module, progress curve models are fit to derive escalation parameters. A progress curve in log-log scale is a line, which has slope and intercept, which are escalation parameters (because it is progress curve model, meaning escalation of the process) and at the same time regression parameters because they are obtain as a result of fitting model to the data points (inter-event time and intensities time series). Given identified inter-event times and intensities for each period, progressive curve models are fit to identify parameters: slope and intercepts (e.g., the progress curve formula in log-log scale). Then, a regression line is fit on (de)escalation parameters from all periods. This provides a basis for identifying escalation parameters (i.e., slope) given inter-event time and intensity (i.e., intercepts). The same steps are performed for inter-event intensity.

Figure 5:
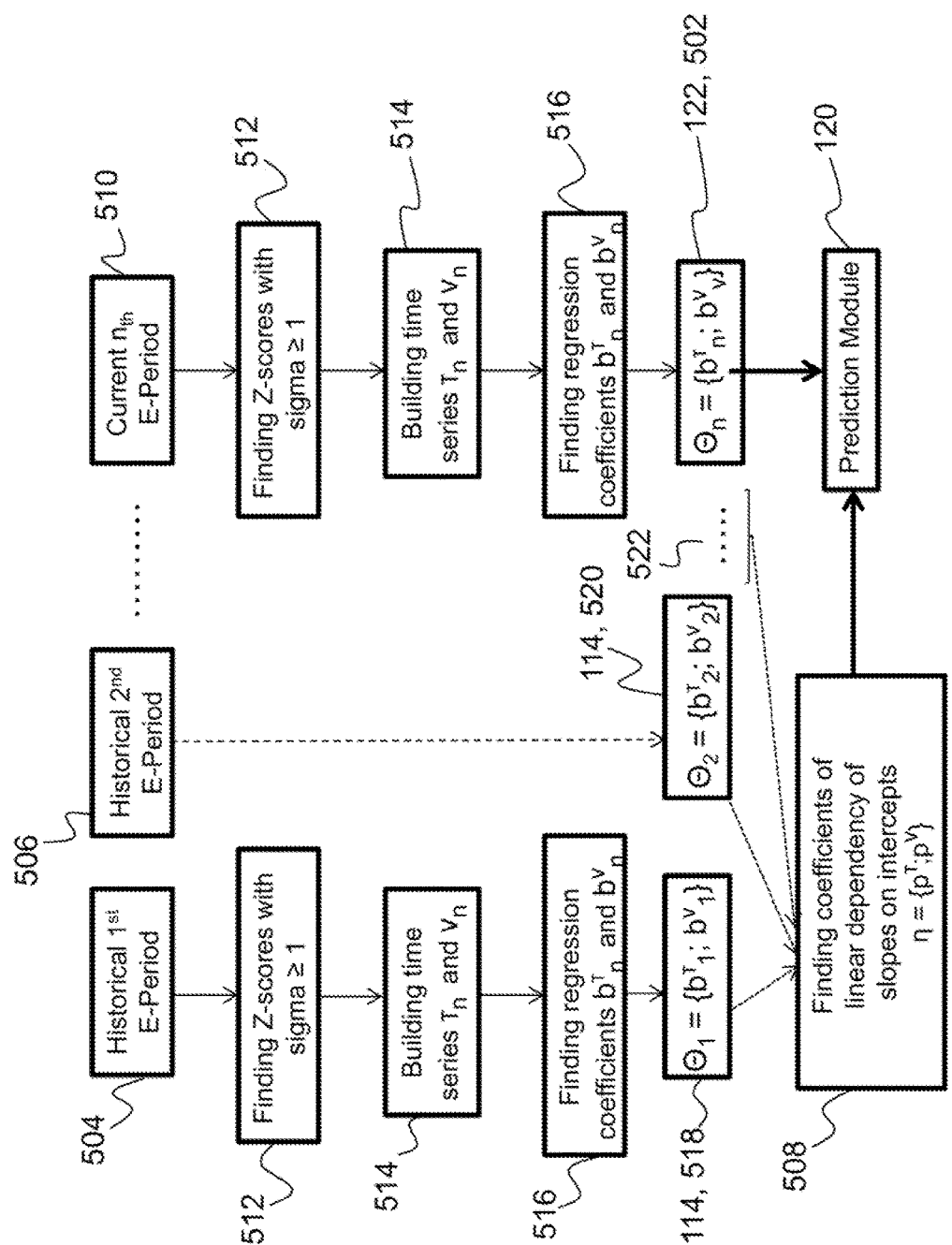
FIG. 5 illustrates an escalation parameter fitting module according to the principles of the present invention.

FIG. 5 illustrates an aspect of the scheme of the escalation parameter fitting module. Parameters used in the prediction module 120 are obtained from either a current E-period 500 in the form of a regression parameter $\theta_n = \{b_n^{\tau}, b_n^{v}\}$ 502 or from the historical data sets (historical 1$^{st}$ E-period 504 and historical 2$^{nd}$ E-period 506) where coefficients of linear dependency of slopes on intercepts ($\eta = \{p^{\tau}, p^{v}\}$) are found 508. Fitting is performed separately for time series with positive and negative values.

Referring to FIG. 5, escalation parameter fitting for both the historical data sets 502 and 504 as well as the current E-period 510 requires first finding Z-scores with sigma≥1, 512. Next, time series $\tau_n$ and $v_n$ are built/generated 514, as described above. The subsequent step involves finding regression coefficients $b_n^{\tau}$ and $b_n^{v}$ 516. Next, regression parameters $\Theta_1 = \{b_1^{\tau}, b_1^{v}\}$ (corresponding to the historical 1$^{st}$ E-period 504), $\Theta_2 = \{b_2^{\tau}, b_2^{v}\}$ (corresponding to the historical 2$^{nd}$ E-period 506), and $\Theta_n = \{b_n^{\tau}, b_n^{v}\}$ 502 (corresponding to the current E-period 510) are determined. Element number 522 represents any number of regression parameters prior to $\Theta_n = \{b_n^{\tau}, b_n^{v}\}$ 502. The parameters described can be found using, for example, generalized linear models (as implemented in MATLAB™ produced by The MathWorks, Inc.) or any other implementation of linear regression.

Figure 6A:
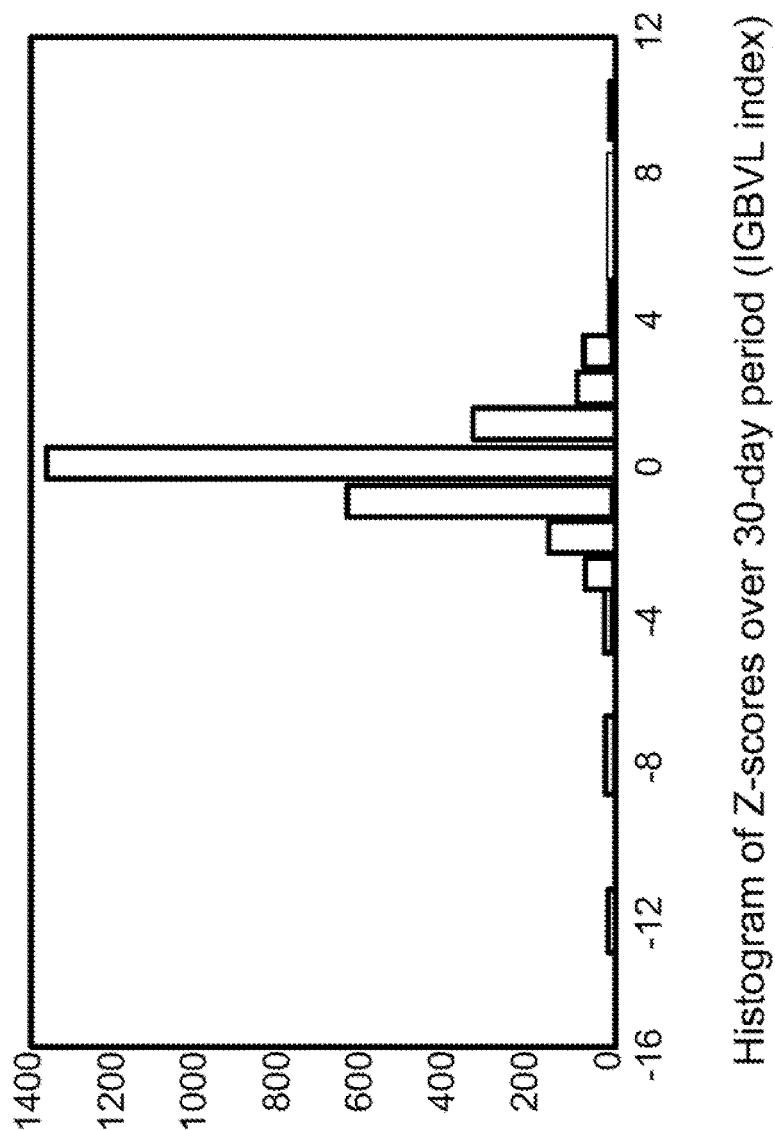
FIG. 6A illustrates a histogram of Z-scores from the IGBVL index over a 30-day period according to the principles of the present invention.
Figure 6B:
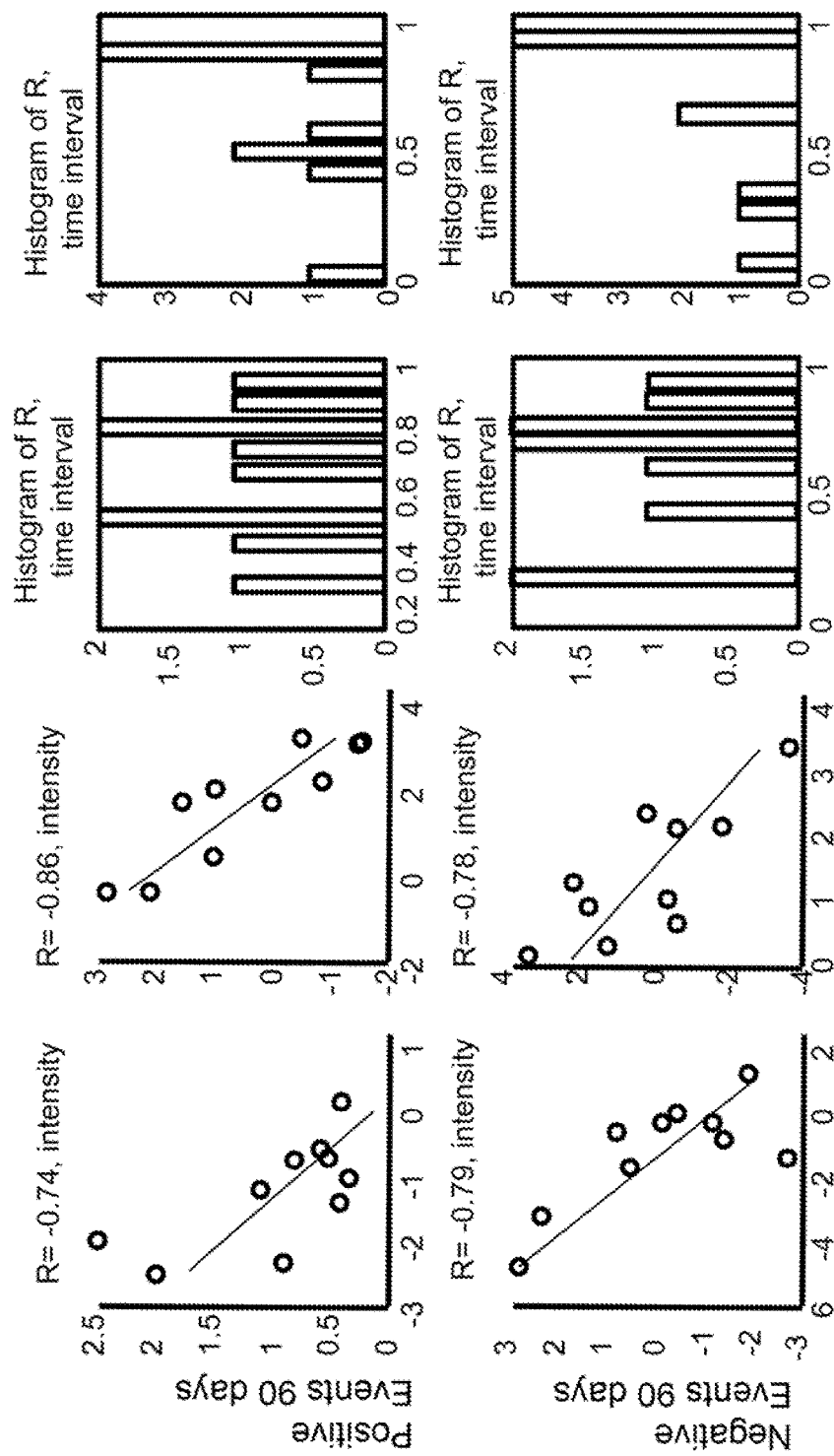
FIG. 6B illustrates results for a progress model curve (PCM) fit for the data in FIG. 6A according to the principles of the present invention.

FIGS. 6A and 6B show results for a PCM fit for an IGBVL index. One can observe that intercepts and slopes obtained from all E-periods obey a simple linear relationship with a reasonably good correlation, as indicated by correlation coefficients shown in FIG. 6B containing four plots with scattered points and lines on the left-hand side of the figure, where the x-axes represent intercepts, and the y-axes represent slopes for fits for different E-periods. This is likely explained by the limited range of Z-score values and low frequency of the events to happen. The four plots on the right-hand side of FIG. 6B are histograms which have bins with values of data points along the x-axes and frequencies of occurrences of these data points along the Y-axes.

It is a known fact that time series of differences of stock market indexes belong to the class of heavy tailed distribution, as shown in FIG. 6A, with rare occurrences of events with significantly large values. As depicted in FIG. 6A, rare occurrences of events with absolute values>4, which are tiny but still visible on the plot (in case of normal distribution they would not be seen). This leads to the limited range of numbers drawn to construct time series building in the escalation/excitation process, which leads to the limited range of regression coefficients. Note that the variance of intercepts is not independent from that of the slopes; they are related through the variance of data being subject to regression.

To illustrate the working of escalation parameter fitting module, results of the PCM fitting module of a Z-score time series calculated over a 90-day period for the IGBVL index starting from July 2007 to July 2012 are presented in the FIG. 6B, which includes pooled together regression coefficients in the form of dependency of slope on intercept and distribution of correlation coefficients calculated per each E-period. Here, R is a Pearson correlation coefficient.

Once regression parameters $\Theta_n = \{b_n^\tau, b_n^v\}$ for each E-period are calculated and parameters $\eta = \{p^\tau; p^v\}$ characterizing a pooled set of regression coefficients are obtained, the process continues to predicting the significant event for the current E-period. Two sets of parameters serve as an input for two different paths used for prediction. The prediction module (depicted as element 120 in FIG. 1) is described in detail below. For clarity, $\Theta_n = \{b_n^\tau, b_n^v\}$ (regression parameters) are progress curve fits, and $\eta = \{p^\tau; p^v\}$ (regression coefficients) are linear fits of intercepts on slopes from $\Theta_n = \{b_n^\tau, b_n^v\}$.

(4.3) Prediction

The section above described how progress curve modeling can be used to analyze the behavior of financial time series of stock indexes and currency exchange rates. For instance, the increasing of absolute values of Z-scores within one escalation period can be described using the progress curve formula with a satisfactory accuracy according to experimental studies. Additionally, the parameters $\Theta_n = \{b_n^\tau, b_n^v\}$ for each E-period can be pooled together, and the dependence of slopes on intercepts $\eta = \{b_n^\tau, b_n^v\}$ can be obtained. To predict a date of the significant event for the current E-period two approaches are described in this section. The first set $\theta_n$ is used in an extrapolation method, and the second set $\eta$ enters the second prediction block by utilizing historical data (i.e., trained) obtained from the linear dependency of the intercept on the slope. The extrapolation method is as follows: if a current E-period has peaks with absolute values≥1 and ≤4 (or 3 for 90 days times series), one obtains escalation (progress curve fit) parameters $\theta_n$. This fit can be extrapolated further in time to when a significant event occurs. Extrapolation refers to the method to extrapolate the process further in time, if model parameters are defined.

Figure 7:
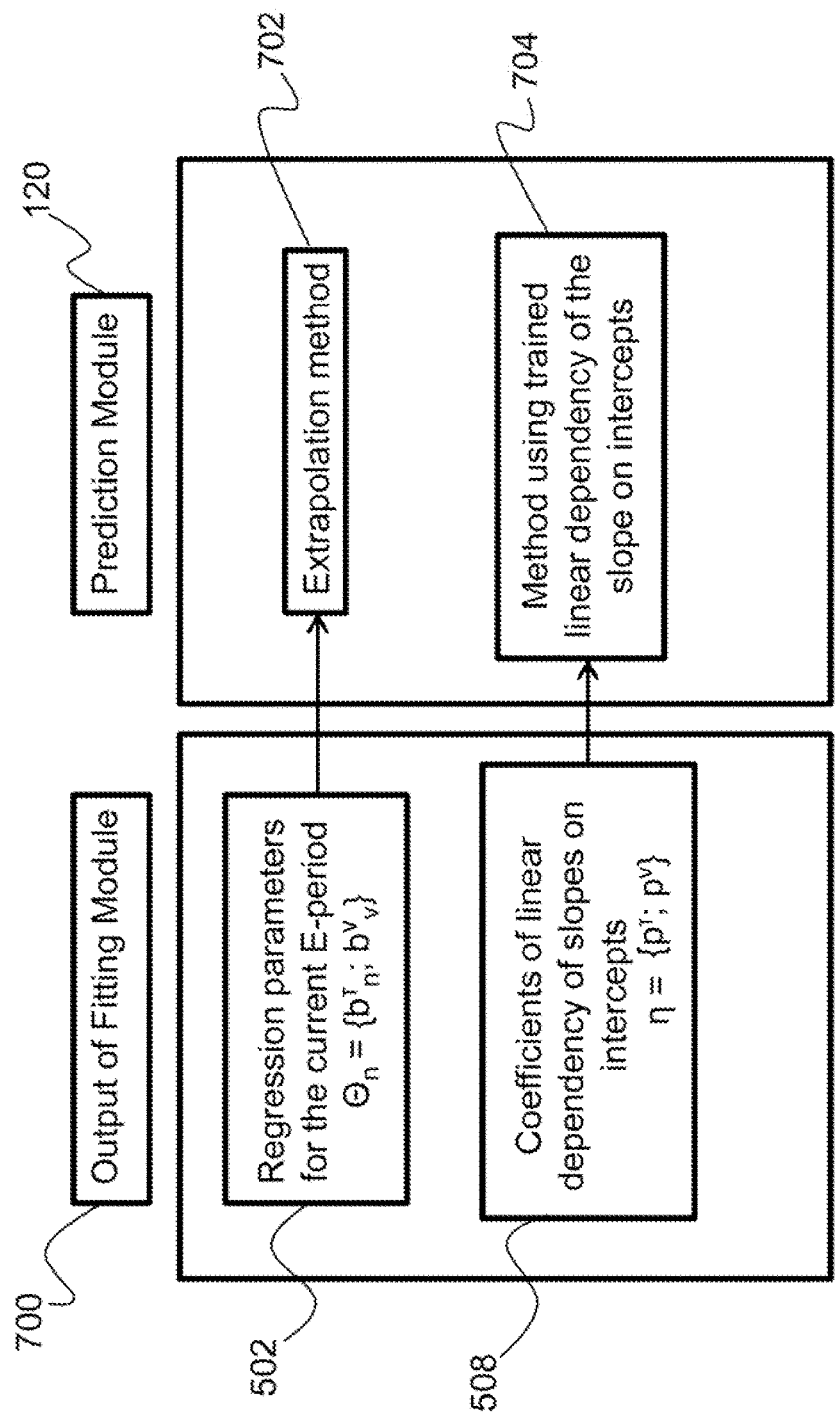
FIG. 7 illustrates a scheme of the output of a fitting module according to the principles of the present invention.

FIG. 7 depicts a scheme of the output of a fitting module 700 being used in the prediction module (depicted as element 120 in FIG. 1). Parameters used in the prediction module 120 are obtained from regression coefficients (i.e., escalation (progress curve fit) parameters) for the current E-period 502 ($\theta_n = \{b_n^\tau; b_n^v\}$ or from the historical data sets (i.e., coefficients of linear dependency of slopes on intercepts $\eta = \{p^\tau; p^v\}$ 508). The regression coefficients for the current E-period 502 are used in an extrapolation method 702, while the set $\eta$ 508 is used in a method using trained linear dependency of the slope on intercepts 704. Fitting is performed separately for time series with positive and negative values.

The relationship between inter-event time and intensity provides a tool for prediction of future significant events. As soon as several points of a building escalation process are observed, one can predict at what moment in the future the significant event exceeding 4 (-4) sigma for a 30-day Z-score time series and 3 (-3) for a 90-day Z-score time series will occur. To predict this event, a simple formula for integration over inter-event intensities is used as follows:

$$n = \exp\left(\frac{(I - Z_0)(-b_v + 1)}{v_1}\right) / (-b_v + 1), \qquad (2)$$

where I is a value of a significant Z-score; $Z_0$ is a Z-score value at the time moment of a first sigma event; $b_v$ is a slope of the PCM fit for an intensities sequence; and $v_1$ is an intercept of the fit. Knowing the number of the inter-event interval n and parameters of the PCM fit for a time interval, one can calculate the final date of the significant event. This formula represents the heart of the extrapolation process.

FIGS. 8A-8D illustrate results of prediction using the extrapolation method according to the principles of the present invention. Open circles 800 represent significant events, closed circles 802 represent a predicted date of an event, bold dashed lines 804 connect predicted events (closed circles 802) and actual, significant events (open circles 800). Vertical dashed lines 806 separate E-periods. The results illustrate the predictive power of the extrapolation method for the IGBVL index, as shown by the closeness of predicted and real events. FIGS. 8A and 8B illustrate the extrapolation method for positive and negative events in a 30-day time period, respectively. FIGS. 8C and 8D illustrate the extrapolation method for positive and negative events in a 90-day time period, respectively.

As mentioned above, the slopes and intercepts of the PCM fits for both inter-event time intervals and intensities obey a linear dependency with correlation R>0.7 reasonably well. Additionally, regression parameters for the linear relationships can be used for prediction. The advantage of this approach, as opposed to an extrapolation procedure, is that one needs only the first time interval between "dark" events to make a prediction. Therefore, the final process uses the same formula (equation 2) as the extrapolation method, but regression parameters for both sequences are taken from historical data. To test the prediction using distribution of regression coefficients obtained from historical data, a longer time span was used. For example, stock indexes from the beginning of 2002 to July of 2012 were utilized for the longer time plan. This helped to increase the statistical power, since significant events are relatively rare events.

(4.3) Statistical Test of Significance

Three significance tests were performed to confirm the validity of using the progress curve model to predict significant events, the results of which are depicted in FIGS. 9A-9D. Time series reshuffling at the level of the entire time span with fixed time limits of E-periods was employed in method I; reshuffling within the E-period was accomplished in the method II; and method III worked with reshuffled inter-event time and intensities sequences.

To perform statistical tests, parameters $\theta_n = \{b_n^\tau; b_n^v\}$ per each E-period were pooled from all stock indexes and currency rates to reach a statistical power allowing the generation of statistical tests. Pooling was possible because Z-score values are standardized metrics as opposed to daily changes of the market. Thus, Z-scores can be used to reveal and investigate behavior and features common for time series representing different indexes. In experimental studies, the pooled set of regression parameters reveals properties similar to those observed for fits individual for each indicator (e.g., stock indices, exchange rates). Distributions are used to test for significance and compared against those obtained from randomizing procedures.

FIGS. 9A-9D are table illustrating p-values for a T test (distributions of regression coefficients) and a Wicoxon non-parametric rank sum test for distributions of correlation coefficients obtained from the experimental studies described above. Tests for regression coefficients were made for intercepts and slopes separately. FIGS. 9A and 9B contain data for positive and negative events in a 30-day time period, respectively. FIGS. 9C and 9D include data for positive and negative events in a 90-day period, respectively. Method II (i.e., reshuffling of Z-score values within an E-period) does not show statistical significance, as indicated by the fact that the majority of p-values are >0.05. As shown in the tables of FIGS. 9A-9D, the majority of p-values are <0.05 for method I and method III, indicating that the observed patterns and predictions based on the PCM fit does not happen at random.

Figure 10:
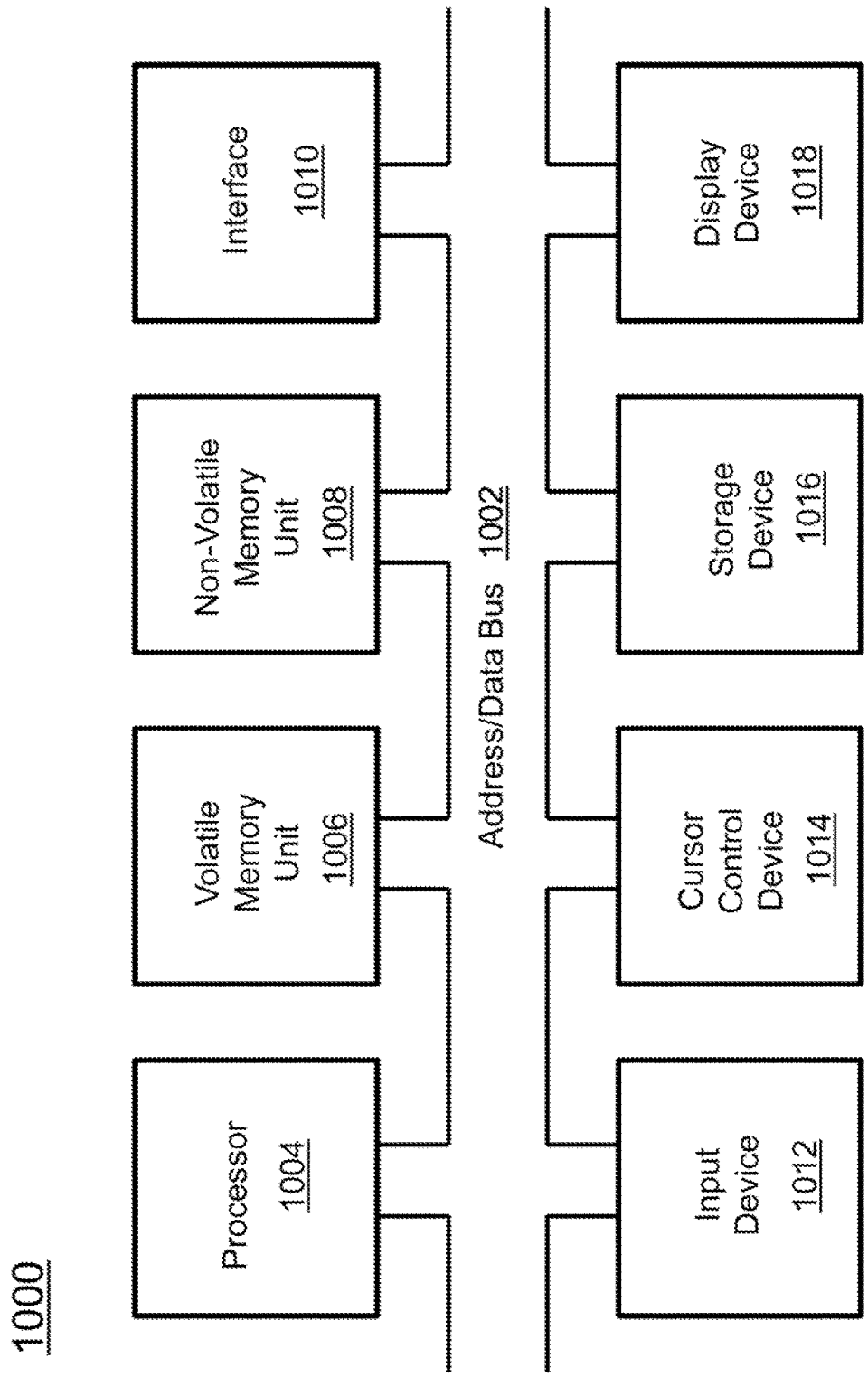
FIG. 10 is an illustration of a data processing system according to the principles of the present invention.

An example of a computer system 1000 in accordance with one aspect is shown in FIG. 10. The computer system 1000 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 1000. When executed, the instructions cause the computer system 1000 to perform specific actions and exhibit specific behavior, such as described herein.

The computer system 1000 may include an address/data bus 1002 that is configured to communicate information. Additionally, one or more data processing units, such as a processor 1004, are coupled with the address/data bus 1002. The processor 1004 is configured to process information and instructions. In one aspect, the processor 1004 is a microprocessor. Alternatively, the processor 1004 may be a different type of processor such as a parallel processor, or a field programmable gate array.

The computer system 1000 is configured to utilize one or more data storage units. The computer system 1000 may include a volatile memory unit 1006 (e.g., random access memory ("RAM"), static RAM, dynamic RAM, etc.) coupled with the address/data bus 1002, wherein a volatile memory unit 1006 is configured to store information and instructions for the processor 1004. The computer system 1000 further may include a non-volatile memory unit 1008 (e.g., read-only memory ("ROM"), programmable ROM ("PROM"), erasable programmable ROM ("EPROM"), electrically erasable programmable ROM "EEPROM"), flash memory, etc.) coupled with the address/data bus 1002, wherein the non-volatile memory unit 1008 is configured to store static information and instructions for the processor 1004. Alternatively, the computer system 1000 may execute instructions retrieved from an online data storage unit such as in "Cloud" computing. In an embodiment, the computer system 1000 also may include one or more interfaces, such as an interface 1010, coupled with the address/data bus 1002. The one or more interfaces are configured to enable the computer system 1000 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 1000 may include an input device 1012 coupled with the address/data bus 1002, wherein the input device 1012 is configured to communicate information and command selections to the processor 1000. In accordance with one aspect, the input device 1012 is an alphanumeric input device, such as a keyboard, that may include alphanumeric and/or function keys. Alternatively, the input device 1012 may be an input device other than an alphanumeric input device. In one aspect, the computer system 1000 may include a cursor control device 1014 coupled with the address/data bus 1002, wherein the cursor control device 1014 is configured to communicate user input information and/or command selections to the processor 1000. In one aspect, the cursor control device 1014 is implemented using a device such as a mouse, a track-ball, a track-pad, an optical tracking device, or a touch screen. The foregoing notwithstanding, in one aspect, the cursor control device 1014 is directed and/or activated via input from the input device 1012, such as in response to the use of special keys and key sequence commands associated with the input device 1012. In an alternative aspect, the cursor control device 1014 is configured to be directed or guided by voice commands.

In one aspect, the computer system 1000 further may include one or more optional computer usable data storage devices, such as a storage device 1016, coupled with the address/data bus 1002. The storage device 1016 is configured to store information and/or computer executable instructions. In one aspect, the storage device 1016 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 1018 is coupled with the address/data bus 1002, wherein the display device 1018 is configured to display video and/or graphics. In one aspect, the display device 1018 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 1000 presented herein is an example computing environment in accordance with one aspect. However, the non-limiting example of the computer system 1000 is not strictly limited to being a computer system. For example, one aspect provides that the computer system 1000 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 11:
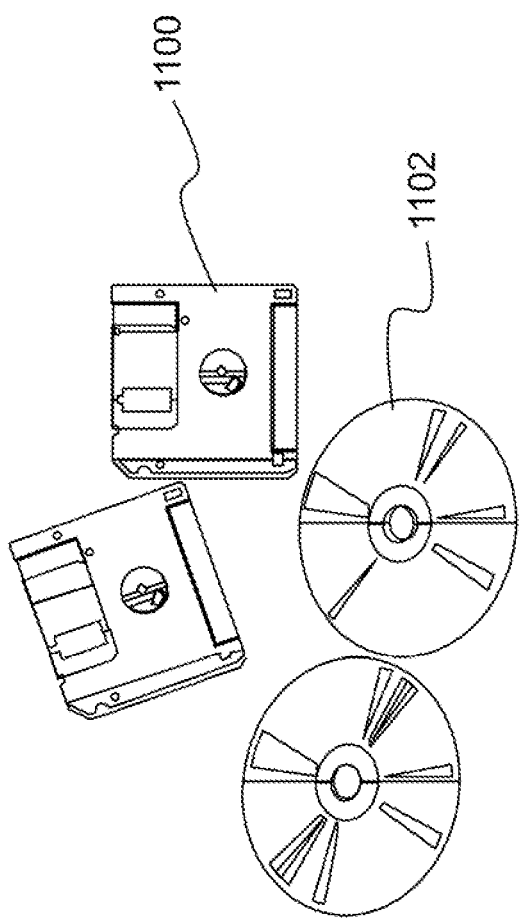
FIG. 11 is an illustration of a computer program product according to the principles of the present invention.

An illustrative diagram of a computer program product embodying an aspect of the present invention is depicted in FIG. 11. As a non-limiting example, the computer program product is depicted as either a floppy disk 1100 or an optical disk 1102. However, as mentioned previously, the computer program product generally represents computer readable code (i.e., instruction means or instructions) stored on any compatible non-transitory computer readable medium.

What is claimed is:

1. A system for predicting events using a progress curve model, the system comprising:
   one or more processors and a non-transitory memory having instructions encoded thereon such that when the instructions are executed, the one or more processors perform operations of:
   determining Z-score values for a predetermined period of a time series;
   generating a Z-score time series from the Z-score values;
   partitioning the Z-score time series into a plurality of E-periods to define a plurality of time frames for progress curve model (PCM) fitting, wherein an E-period is defined as a period of escalation and de-escalation;
   deriving a set of regression parameters for PCMs; and
   generating a prediction of a financial market event in a current E-period based on the set of regression parameters.

2. The system as set forth in claim 1, wherein the set of regression parameters are derived from historical data or directly from the current E-period.

3. The system as set forth in claim 2, wherein the one or more processors further perform operations of:
   identifying Z-score values with a sigma value greater than or equal to one;
   generating a set of series $\tau_n$ and $v_n$ for the identified Z-score values, wherein $\tau_n$ is an inter-event time series and $v_n$ is an inter-event intensity series;
   determining regression coefficients $b^\tau_n$ and $b^v_n$ from the set of series $\tau_n$ and $v_n$;
   determining the set of regression parameters $\Theta_n = \{b_n^\tau, b_n^v\}$ for each E-period n from the regression coefficients $b^\tau_n$ and $b^v_n$; and
   obtaining a set of parameters $\eta = \{p^\tau; p^v\}$ characterizing a pooled set of regression coefficients.

4. The system as set forth in claim 3, wherein the set of regression parameters $\Theta_n$ serve as an input to a first path for predicting the financial market event, and the set of parameters $\eta$ serve as an input to a second path for predicting the financial market event.

5. The system as set forth in claim 4, wherein the one or more processors further perform an operation of using the set of regression parameters $\Theta_n$ in an extrapolation method for predicting the financial market event according to the following:

$$n = \exp\left(\frac{(I - Z_0)(-b_v + 1)}{v_1}\right) \Big/ (-b_v + 1),$$

where I is a value of a significant Z-score; $Z_0$ is a Z-score value at the time moment of a first sigma event; $b_v$ is a slope of a PCM fit for an inter-event intensity series, and $v_1$ is an intercept of the PCM fit.

6. The system as set forth in claim 4, wherein the one or more processors further perform an operation of using the set of parameters $\eta$ in a method using trained linear dependence of the slope on intercepts.

7. A computer-implemented method for predicting events using a progress curve model, comprising:
   an act of causing a data processor to execute instructions stored on a non-transitory memory such that upon execution, the data processor performs operations of:
   determining Z-score values for a predetermined period of a time series;
   generating a Z-score time series from the Z-score values;
   partitioning the Z-score time series into a plurality of E-periods to define a plurality of time frames for progress curve model (PCM) fitting, wherein an E-period is defined as a period of escalation and de-escalation; and
   deriving a set of regression parameters for PCMs; and
   generating a prediction of a financial market event in a current E-period based on the set of regression parameters.

8. The method as set forth in claim 7, wherein the set of regression parameters are derived from historical data or directly from the current E-period.

9. The method as set forth in claim 8, wherein the data processor further performs operations of:
   identifying Z-score values with a sigma value greater than or equal to one;
   generating a set of series $\tau_n$ and $v_n$ for the identified Z-score values, wherein $\tau_n$ is a inter-event time series and $v_n$ is an inter-event intensity series;
   determining regression coefficients $b^\tau_n$ and $b^v_n$ from the set of series $\tau_n$ and $v_n$;
   determining the set of regression parameters $\Theta_n = \{b_n^\tau, b_n^v\}$ for each E-period n from the regression coefficients $b^\tau_n$ and $b^v_n$; and
   obtaining a set of parameters $\eta = \{p^\tau; p^v\}$ characterizing a pooled set of regression coefficients.

10. The method as set forth in claim 9, wherein the set of regression parameters $\Theta_n$ serve as an input to a first path for predicting the financial market event, and the set of parameters $\eta$ serve as an input to a second path for predicting the financial market event.

11. The method as set forth in claim 10, wherein the data processor further performs an operation of using the set of regression parameters $\Theta_n$ in an extrapolation method for predicting the financial market event according to the following:

$$n = \exp\left(\frac{(I - Z_0)(-b_v + 1)}{v_1}\right) \Big/ (-b_v + 1),$$

where I is a value of a significant Z-score; $Z_0$ is a Z-score value at the time moment of a first sigma event; $b_v$ is a slope of a PCM fit for an inter-event intensity series, and $v_1$ is an intercept of the PCM fit.

12. The method as set forth in claim 10, wherein the data processor further performs an operation of using the set of parameters $\eta$ in a method using trained linear dependence of the slope on intercepts.

13. A computer program product for predicting events using a progress curve model, the computer program product comprising computer-readable instructions stored on a non-transitory computer-readable medium that are executable by a computer having a processor for causing the processor to perform operations of:

determining Z-score values for a predetermined period of a time series;

generating a Z-score time series from the Z-score values;

partitioning the Z-score time series into a plurality of E-periods to define a plurality of time frames for progress curve model (PCM) fitting, wherein an E-period is defined as a period of escalation and de-escalation; and deriving a set of regression parameters for PCMs; and generating a prediction of a financial market event in a current E-period based on the set of regression parameters.

14. The computer program product as set forth in claim 13, wherein the set of regression parameters are derived from historical data or directly from the current E-period.

15. The computer program product as set forth in claim 14, further comprising instructions for causing the processor to perform operations of:

identifying Z-score values with a sigma value greater than or equal to one;

generating a set of series $\tau_n$ and $v_n$ for the identified Z-score values, wherein $\tau_n$ is a inter-event time series and $v_n$ is an inter-event intensity series;

determining regression coefficients $b^\tau_n$ and $b^v_n$ from the set of series $\tau_n$ and $v_n$;

determining the set of regression parameters $\Theta_n = \{b_n^\tau, b_n^v\}$ for each E-period n from the regression coefficients $b^\tau_n$ and $b^v_n$; and obtaining a set of parameters $\eta\{p^\tau; p^v\}$ characterizing a pooled set of regression coefficients.

16. The computer program product as set forth in claim 15, wherein the set of regression parameters $\Theta_n$ serve as an input to a first path for predicting the financial market event, and the set of parameters $\eta$ serve as an input to a second path for predicting the financial market event.

17. The computer program product as set forth in claim 16, further comprising instructions for causing the processor to perform an operation of using the set of regression parameters $\Theta_n$ in an extrapolation method for predicting the financial market event according to the following:

$$n = \exp\left(\frac{(I - Z_0)(-b_v + 1)}{v_1}\right) / (-b_v + 1),$$

where I is a value of a significant Z-score; $Z_0$ is a Z-score value at the time moment of a first sigma event; $b_v$ is a slope of a PCM fit for an inter-event intensity series, and $v_1$ is an intercept of the PCM fit.

18. The computer program product as set forth in claim 16, further comprising instructions for causing the processor to perform an operation of using the set of parameters $\eta$ in a method using trained linear dependence of the slope on intercepts.

* * * * *